United States Patent
Abbasi et al.

(10) Patent No.: US 12,429,678 B1
(45) Date of Patent: Sep. 30, 2025

(54) HANDHELD MICROSCOPE FOR CANNULATED SURGICAL SYSTEMS

(71) Applicant: Advance Research System, LLC, Edina, MN (US)

(72) Inventors: Hamid R. Abbasi, Edina, MN (US); Kenneth R. Barra, Dallas, GA (US); Stuart J. Olstad, Plymouth, MN (US)

(73) Assignee: Advance Research System, LLC, Edina, MN (US)

( * ) Notice: Subject to any disclaimer, the term of this patent is extended or adjusted under 35 U.S.C. 154(b) by 715 days.

(21) Appl. No.: 17/573,765

(22) Filed: Jan. 12, 2022

Related U.S. Application Data

(60) Provisional application No. 63/240,451, filed on Sep. 3, 2021, provisional application No. 63/155,816, filed on Mar. 3, 2021, provisional application No. 63/136,910, filed on Jan. 13, 2021.

(51) Int. Cl.
*G02B 21/00* (2006.01)
*G02B 21/36* (2006.01)

(52) U.S. Cl.
CPC ..... *G02B 21/0008* (2013.01); *G02B 21/0012* (2013.01); *G02B 21/0032* (2013.01); *G02B 21/361* (2013.01)

(58) Field of Classification Search
CPC ............ G02B 21/0008; G02B 21/0012; G02B 21/0032; G02B 21/361
USPC ....................................................... 359/656
See application file for complete search history.

(56) References Cited

U.S. PATENT DOCUMENTS

| | | | |
|---|---|---|---|
| 5,902,231 A | 5/1999 | Foley et al. | |
| 2010/0027132 A1* | 2/2010 | Hirata | G02B 21/02 359/656 |
| 2013/0258469 A1* | 10/2013 | Park | G02B 5/04 359/834 |
| 2017/0231712 A1* | 8/2017 | Vayser | A61B 1/046 348/68 |
| 2019/0167377 A1* | 6/2019 | Hirose | G02B 21/0012 |

FOREIGN PATENT DOCUMENTS

DE  4304422 C1 * 7/1994 ......... A61B 1/00188

OTHER PUBLICATIONS

Screenshots of https://healthmanagement.org/products/view/all/sinuscope-endoscope-with-working-channel-rigid-wide-angle-4-3-mm-asap-endoscopic-products, publicly available prior to Jan. 13, 2021.
Screenshots of https://carleylamps.com/uploads/CL90052-Carley-Rover-IV-plus-3W-Portable-LED-Light-Source.id.3692.pdf publicly available prior to Jan. 13, 2021.

* cited by examiner

*Primary Examiner* — Stephone B Allen
*Assistant Examiner* — Boutsikaris Leonidas
(74) *Attorney, Agent, or Firm* — Christensen, Fonder, Dardi & Herbert PLLC; Timothy J. Busse

(57) ABSTRACT

A handheld microscope for direct, optical viewing of surgical sites. The system includes an illumination system, as well as viewing optics contained in a housing, the housing being configured for coupling to a proximal end of an access port. In some embodiments, the access port houses a light probe coupled to a source of the illumination system for irradiation of the surgical area. The system may include aspiration capability for clearing debris from the surgical site.

13 Claims, 13 Drawing Sheets

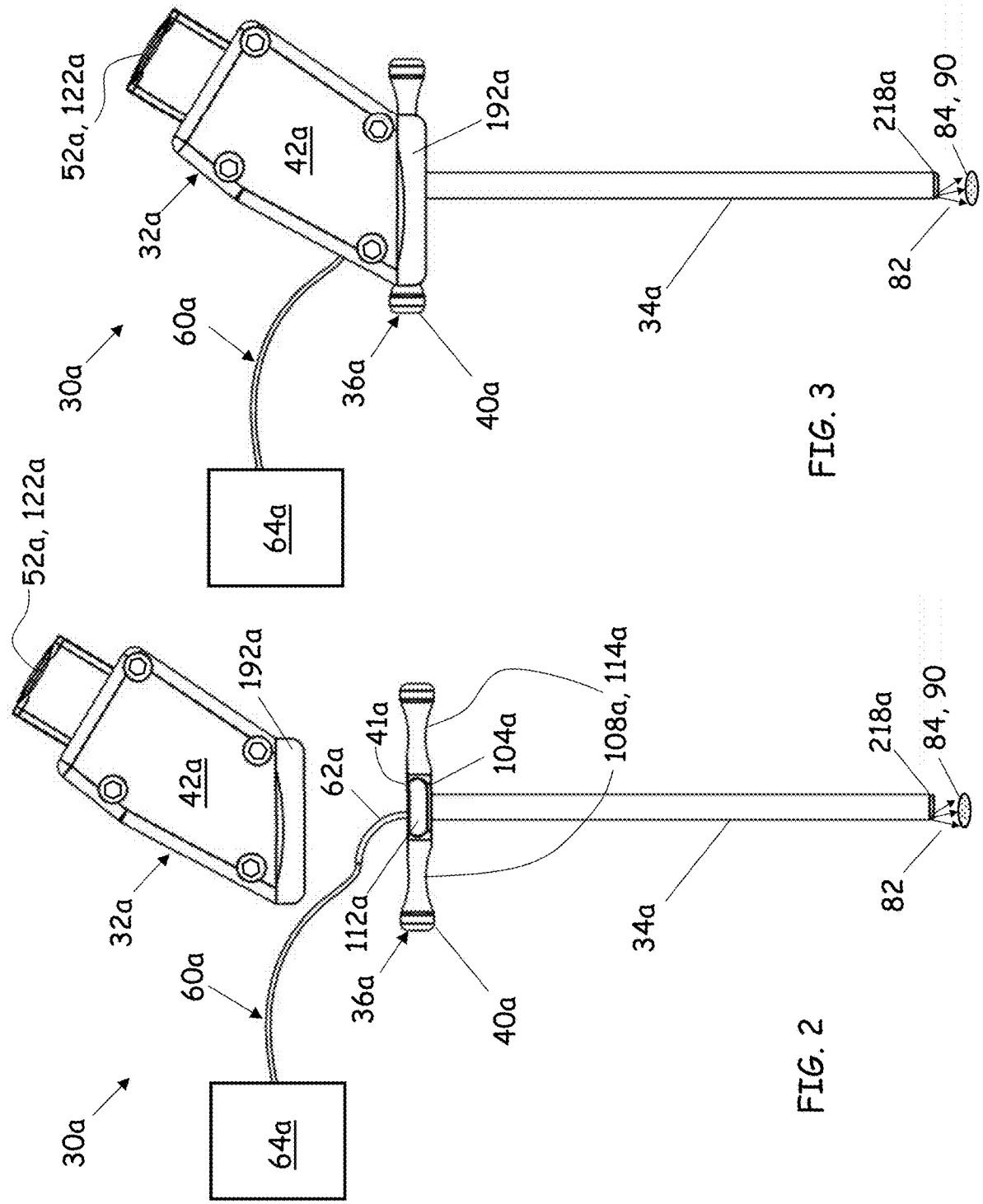

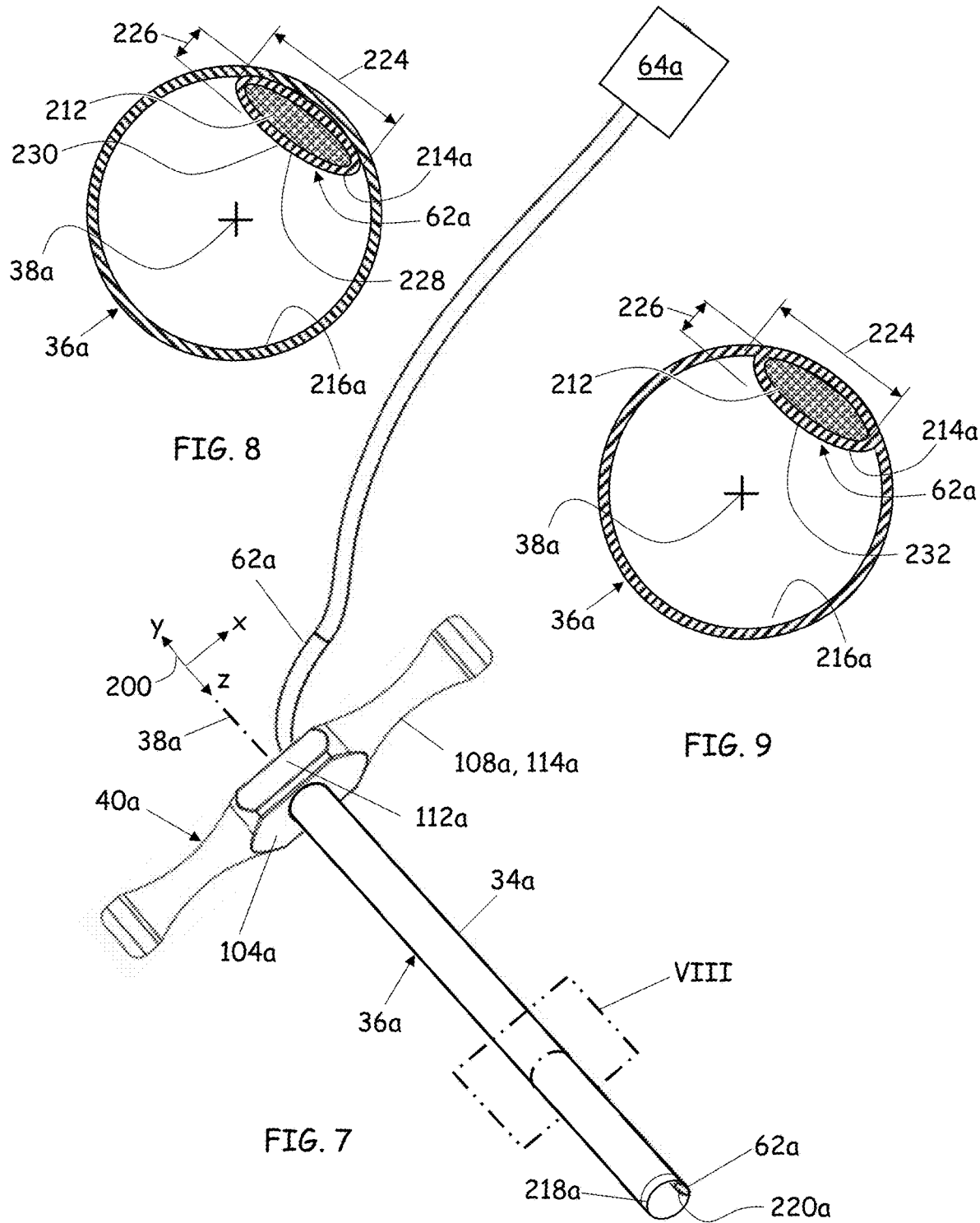

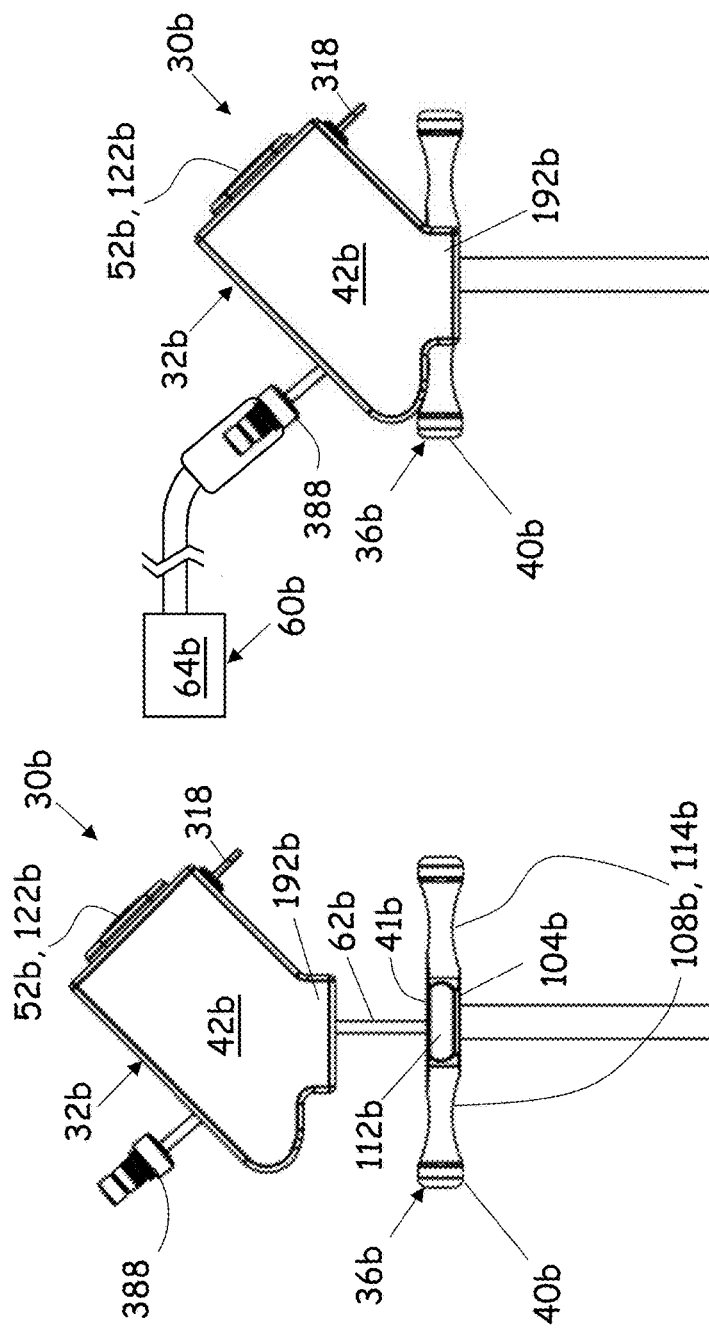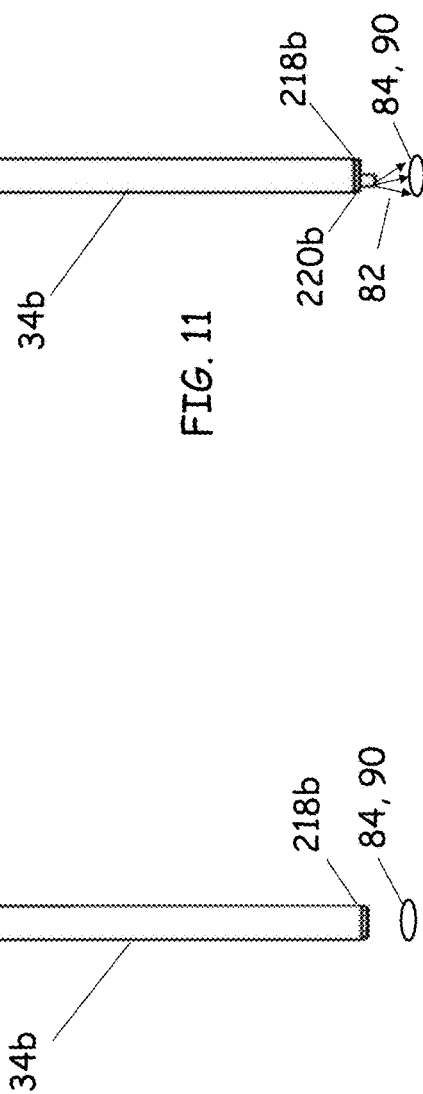
FIG. 11
FIG. 10

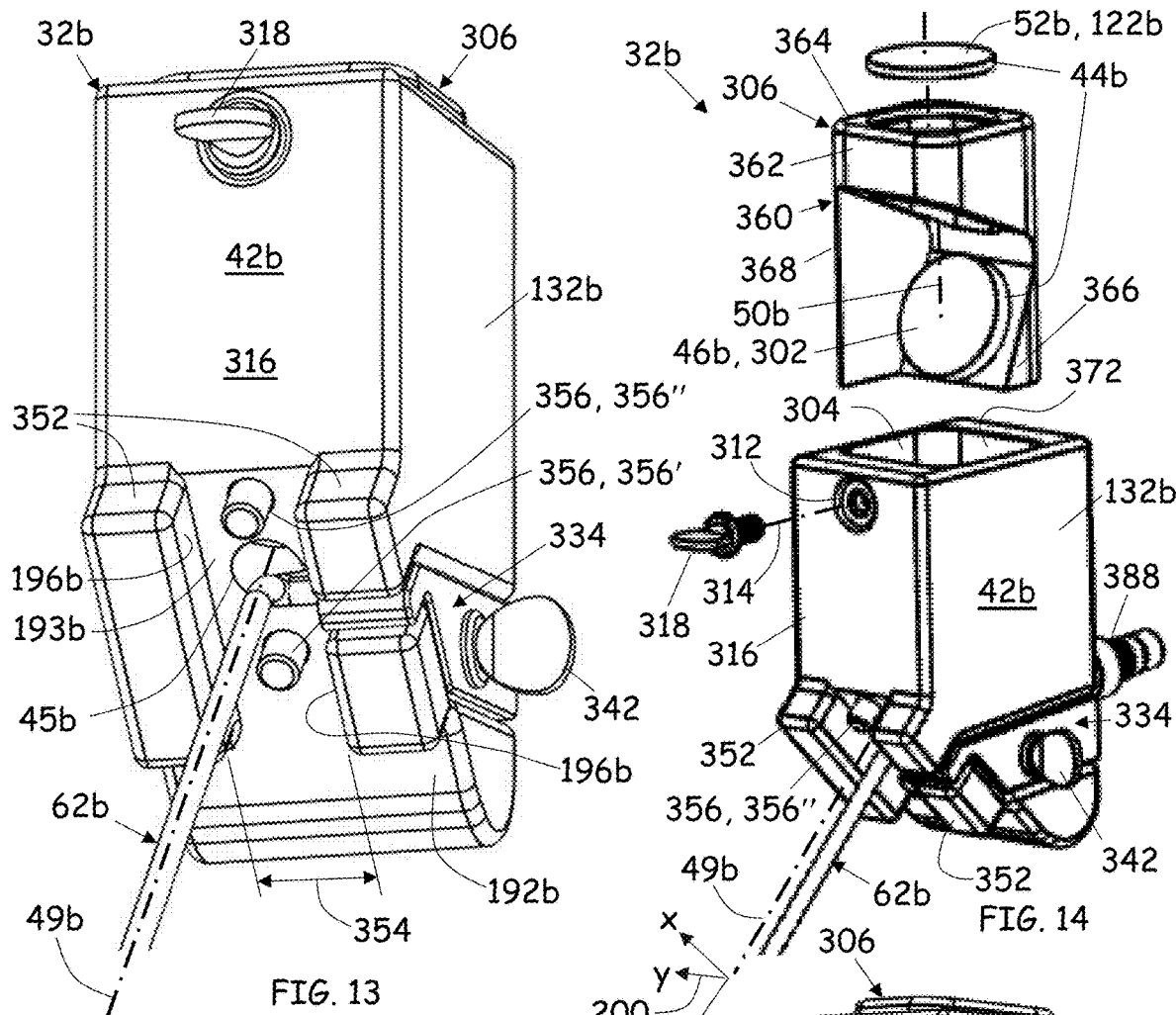
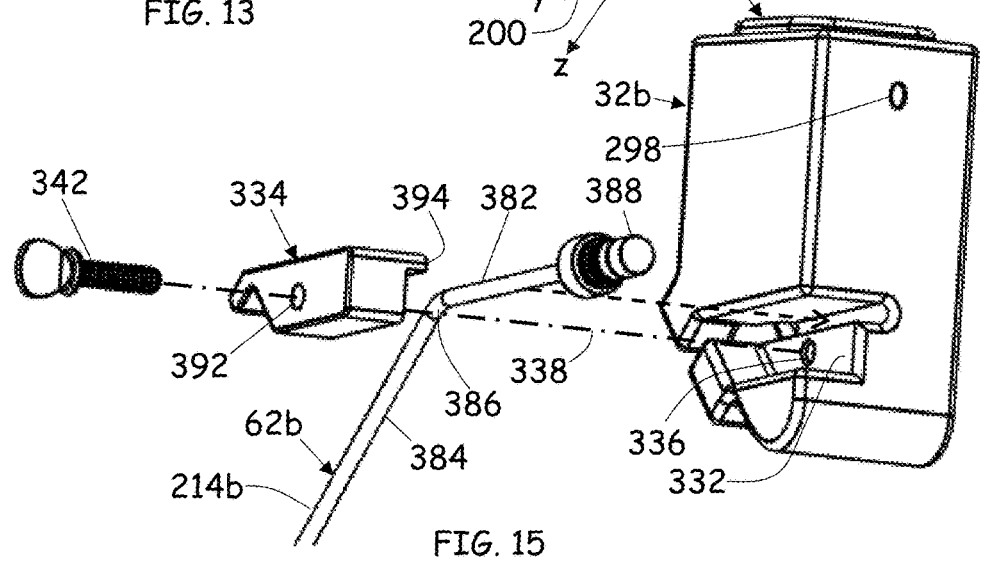

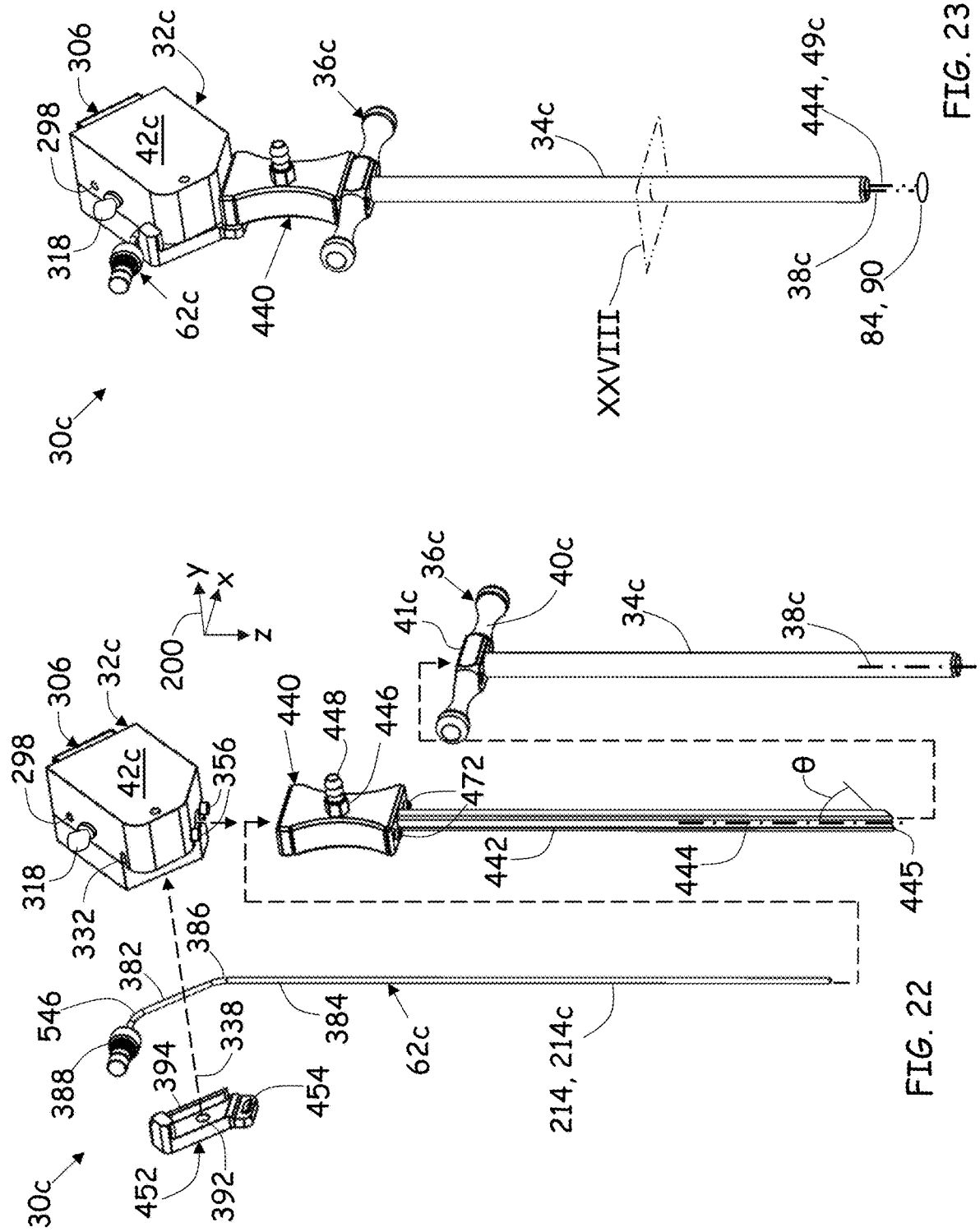

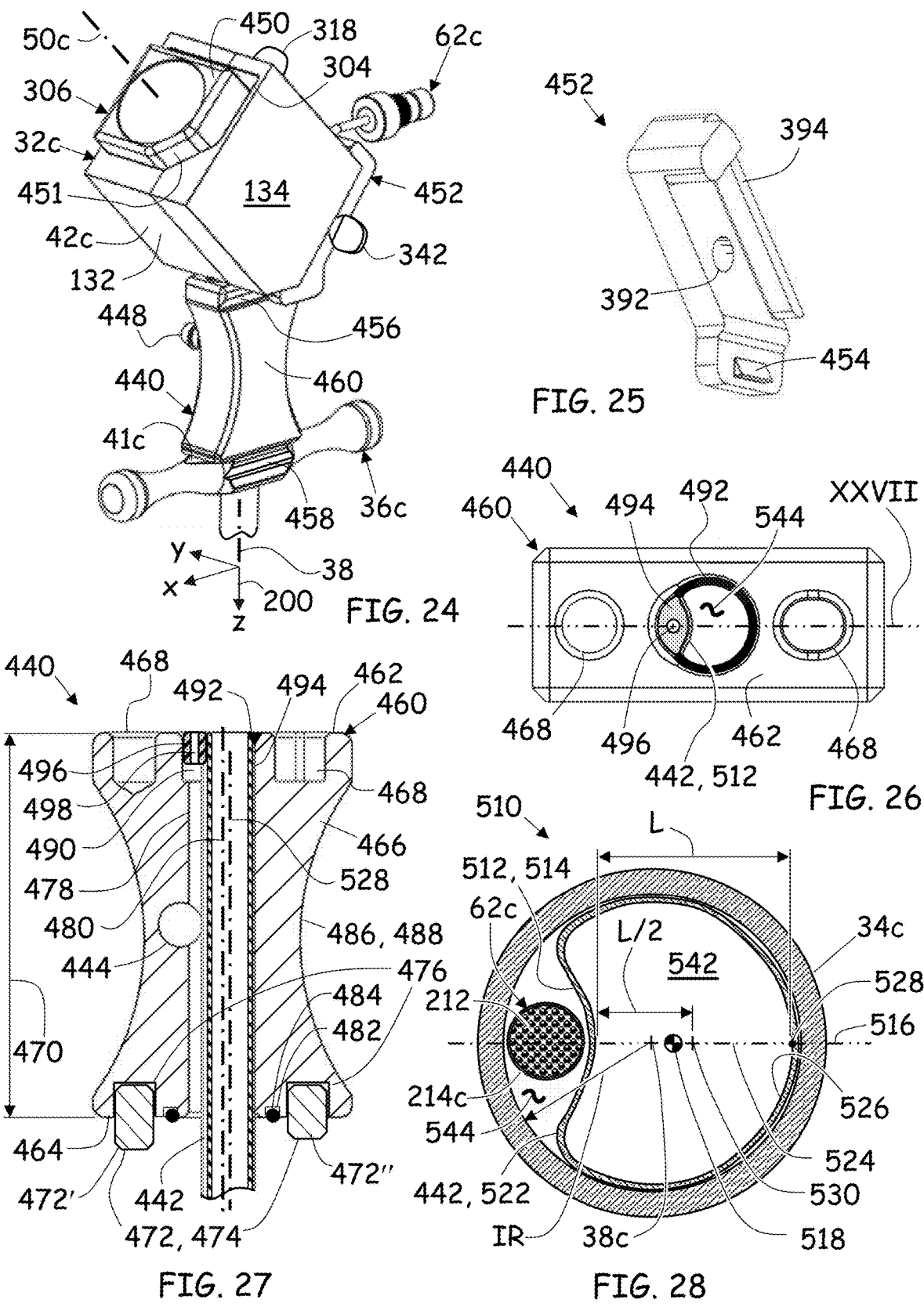

HANDHELD MICROSCOPE FOR CANNULATED SURGICAL SYSTEMS

RELATED APPLICATIONS

This application claims the benefit of U.S. Provisional Patent Application No. 63/136,910, filed Jan. 13, 2020, U.S. Provisional Patent Application No. 63/155,816, filed Mar. 3, 2021, and U.S. Provisional Patent Application No. 63/240,451 filed Sep. 3, 2021, the disclosures of which are hereby incorporated by reference herein in their entirety.

FIELD OF THE DISCLOSURE

This disclosure is directed generally to cannulated surgical systems, and more specifically to viewing systems for cannulated surgical procedures.

BACKGROUND

Minimally invasive surgical (MIS) techniques performed with cannulated surgical systems has enhanced delivery of various therapies, including spinal and sacroiliac procedures. Enhancements include reduction of both surgery times and recovery times. However, cannulated MIS procedures rely on non-visual techniques such as x-rays for surgical site inspection. Such non-visual techniques are limited in terms of their ability inform the surgical personnel regarding the condition of a surgical site and the progress of a surgical procedure. What is needed are devices and procedures that enable rapid visual inspection of surgical sites during cannulated MIS procedures.

SUMMARY OF THE DISCLOSURE

Various embodiments of the disclosure enable intermittent viewing of surgical sites during cannulated MIS procedures. The disclosed systems and techniques enable such viewing without removal of the cannula through which the MIS procedure is being performed. Rather, the cannula (access portal) is utilized to align and stabilize the surgical viewing system. Deployment and removal of the surgical viewing system can be performed in a matter of seconds. In some embodiments, the surgical viewing system also enables removal of debris from the surgical site for enhanced viewing.

Structurally, a viewing system for viewing a surgical site during a cannulated minimally invasive procedure is disclosed, comprising an optical adaptor including a housing that defines an optical inlet port and an optical outlet port, the optical inlet port being defined at a base portion of the housing and subtending a viewing axis of the viewing system, the optical outlet port subtending a transfer axis of the viewing system, the transfer axis intersecting the viewing axis at an acute transfer angle. A light probe may be coupled to the optical adaptor and extending distal to the base portion of the housing and parallel to the viewing axis of the optical adaptor, the light probe being configured to illuminate a surgical site that is distal to the light probe. An access portal may be configured for passage of surgical tools to the surgical site, the access portal being configured for coupling with the base portion of the housing. Viewing optics are configured to view a target at the surgical site through the access portal and transfer reflected light from the target to the optical outlet port. In some embodiments, the light probe includes a fiber optic shim that extends to a distal end of the light probe. Alternatively, the light probe includes a light emitting diode disposed proximate a distal end of the light probe. The viewing optics may include one of a prism and a mirror that transfers the reflected light from the viewing axis to the transfer axis. In some embodiments, the light probe connected to a source that is external to the optical adaptor. The system may also comprise means for preventing obstruction of the target by the light probe.

BRIEF DESCRIPTION OF THE DRAWINGS

FIG. 2 is an elevational view of components of a surgical viewing system according to a first embodiment of the disclosure;

FIG. 3 is an elevational view of the components of the surgical viewing system of FIG. 2 in assembly according to an embodiment of the disclosure;

FIG. 7 is a distal perspective view of an access portal of the surgical viewing system of FIG. 2 according to an embodiment of the disclosure;

FIGS. 8 and 9 are sectional views of the access portal at plane VIII of FIG. 7 according to embodiments of the disclosure;

FIG. 10 is an elevational view of components of a surgical viewing system according to a second embodiment of the disclosure;

FIG. 11 is an elevational view of the components of the surgical viewing system of FIG. 10 in assembly according to an embodiment of the disclosure;

FIG. 13 is a distal perspective view of an optical adaptor for the surgical viewing system of FIG. 10 according to an embodiment of the disclosure; and FIG. 14 is a front perspective, partially exploded view of the optical adaptor of FIG. 13 according to an embodiment of the disclosure;

FIG. 15 is a rear perspective, partially exploded view of the optical adaptor of FIG. 13 according to an embodiment of the disclosure;

FIG. 22 is an exploded perspective view of components of a surgical viewing system according to a third embodiment of the disclosure;

FIG. 23 is a perspective view of the surgical viewing system of FIG. 22 fully assembled according to an embodiment of the disclosure;

FIG. 24 is a partial perspective view of the assembled surgical viewing system of FIG. 23 according to an embodiment of the disclosure;

FIG. 25 is an enlarged, isolated view of a probe retainer for the surgical viewing system of FIG. 22 according to an embodiment of the disclosure;

FIG. 26 is an proximal end view of a spacer assembly of the surgical viewing system according to an embodiment of the disclosure;

FIG. 27 is a partial sectional view of the spacer assembly of the surgical viewing system at plane XXVII of FIG. 26 according to an embodiment of the disclosure; and FIG. 28 is a sectional view at plane XXVIII of the fully assembled surgical viewing system of FIG. 23 according to an embodiment of the disclosure.

DETAILED DESCRIPTION OF THE DRAWINGS

Figure 1:
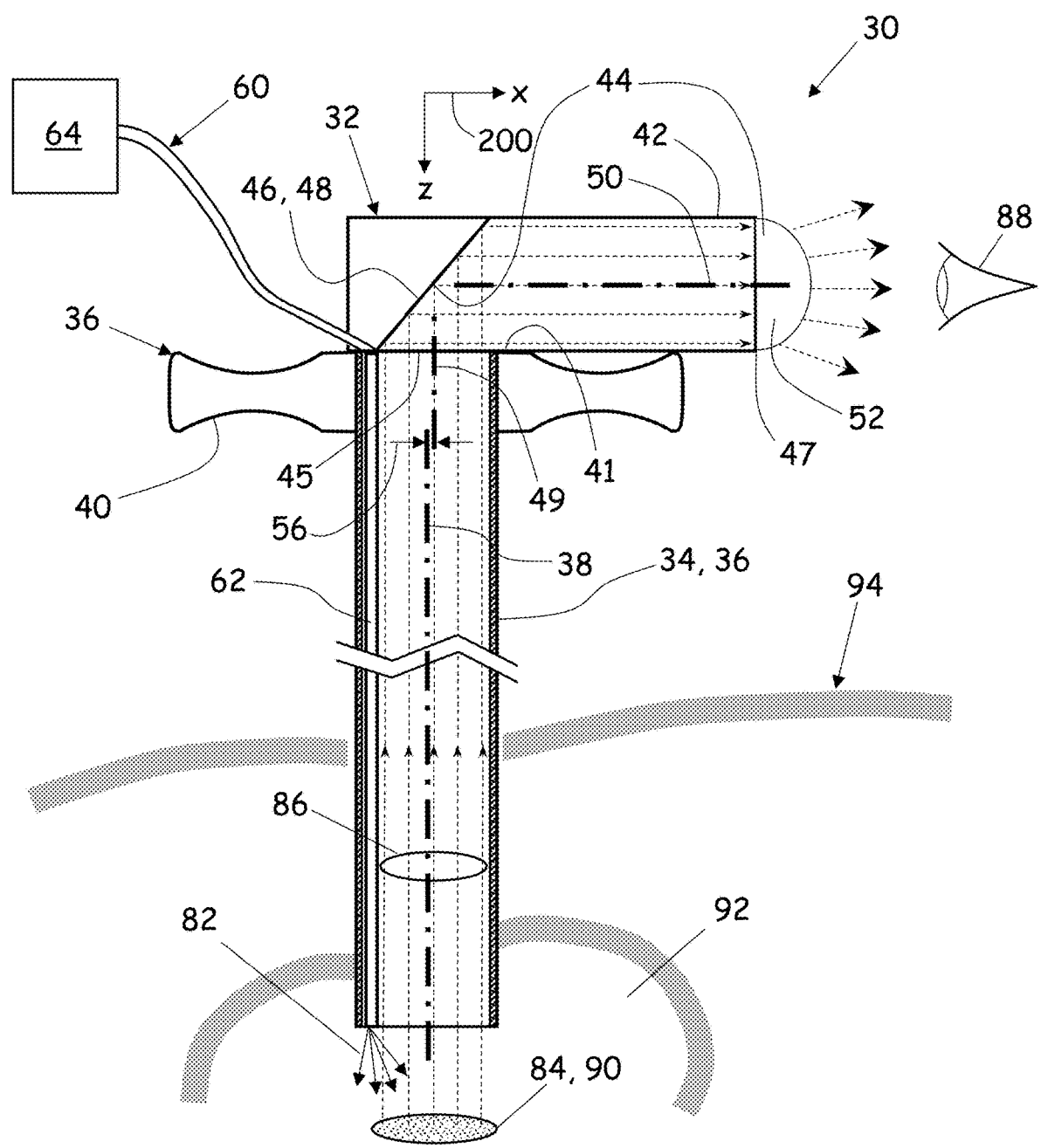
FIG. 1 is a schematic, sectional view of a surgical viewing system according to an embodiment of the disclosure.

Referring to FIG. 1, a schematic of a surgical viewing system 30 is depicted according to an embodiment of the disclosure. The surgical viewing system 30 includes an optical adaptor 32 that is selectively coupled to a proximal end of a tubular structure 34, for example of an access portal 36 for minimally invasive procedures (depicted), the tubular structure 34 defining a central axis 38. In some embodiments, the access portal 36 includes a handle 40 that defines a proximal face 41 on which the optical adaptor 32 is selectively seated. The optical adaptor 32 includes a housing 42 that houses viewing optics 44, the housing 42 defining an optical inlet port 45 and an optical outlet port 47. In some embodiments, the viewing optics 44 include a transfer element 46, such as a reflective prism or mirror 48, that defines a viewing axis 49 of the optical adaptor 32, and also defines a transfer axis 50 along which light is transferred from the viewing axis 49 to the optical outlet port 47. The viewing optics 44 may also include focusing optics 52 (e.g., a loupe) positioned at the optical outlet port 47 through which the transfer axis 50 passes. The viewing axis 49 of the optical adaptor 32 may be substantially parallel to the central axis 38 of the access portal 36. In some embodiments, the viewing axis 49 not concentric with the central axis 38, thereby defining a lateral offset 56 between axes 38 and 49.

The surgical viewing system 30 includes an illumination system 60, which may include, for example, a light probe 62 that extends distally into the tubular structure 34. In some embodiments, the illumination system 60 includes a source 64 that is external to the housing 42 and couples to the light probe 62. Optionally, the source 64 may be housed within the housing 42. Herein, the "source" 64 may be a light source that transmits optical light to the light probe 62, for example via fiber optics. Alternatively, the source 64 may be a power source that transmits power to a light source located locally within the optical adaptor 32 or light probe 62, for example a light emitting diode (LED).

In operation, the illumination system 60 transfers incident light 82 into or through the tubular structure 34 to illuminate a target 84 of a surgical site 90 to be viewed, the target 84 being centered about the viewing axis 49. The target 84 may be within or distal to the tubular structure 34. A reflected light component 86 of the incident light 82 is transferred to the focusing optic 52 via the transfer element 46, providing an image of the target 84 to a viewer 88. The viewer 88 may be a user directly viewing the surgical site 90 (depicted) or an intermediate device such as a video monitoring system. In some embodiments, the focusing optic 52 is adjustable to magnify and focus on the target 84. In this way, the focusing optic 52 may define the target 84. The lateral offset 56, when present, enables viewing of a larger target 84 without having the light probe 62 encroach on or clip the viewed image.

The illustration of FIG. 1 depicts the surgical viewing system 30 as viewing a disc space 92 of a patient 94 during minimally invasive spine surgery, but the surgical viewing system 30 may be used for other applications. In some embodiments, the surgical viewing system 30 is effectively a handheld microscope.

The optical adaptor 32 may be utilized with the access portal 36 during a minimally invasive surgical procedure, such as used in a spinal fusion procedure. In some embodiments, the access portal 36 is at least partially cleared of surgical instruments to enable viewing of the surgical site 90. In some embodiments, the light probe 62 is routed into the tubular structure 34 (e.g., access portal 36) and the housing 42 coupled to the tubular structure 34. Upon illumination of the surgical site 90 with the illumination system 60, the user focuses on the target 84 with the focusing optics 52 for inspection of the surgical site 90.

Following are descriptions and depictions of individual embodiments of the surgical viewing system 30. Herein, the individual embodiments, as well as various components thereof, are referred to generically or collectively by the reference characters referred to in FIG. 1. Individual embodiments, as well as some of the components included therein, are depicted and described using the same reference characters of FIG. 1 followed by a letter suffix. For example, surgical viewing system 30a including an optical adaptor 32a that selectively mounts on the proximal end of a tubular structure 34a, or surgical viewing system 30b including a housing 42b that houses viewing optics 44b, and so on.

Figure 4:
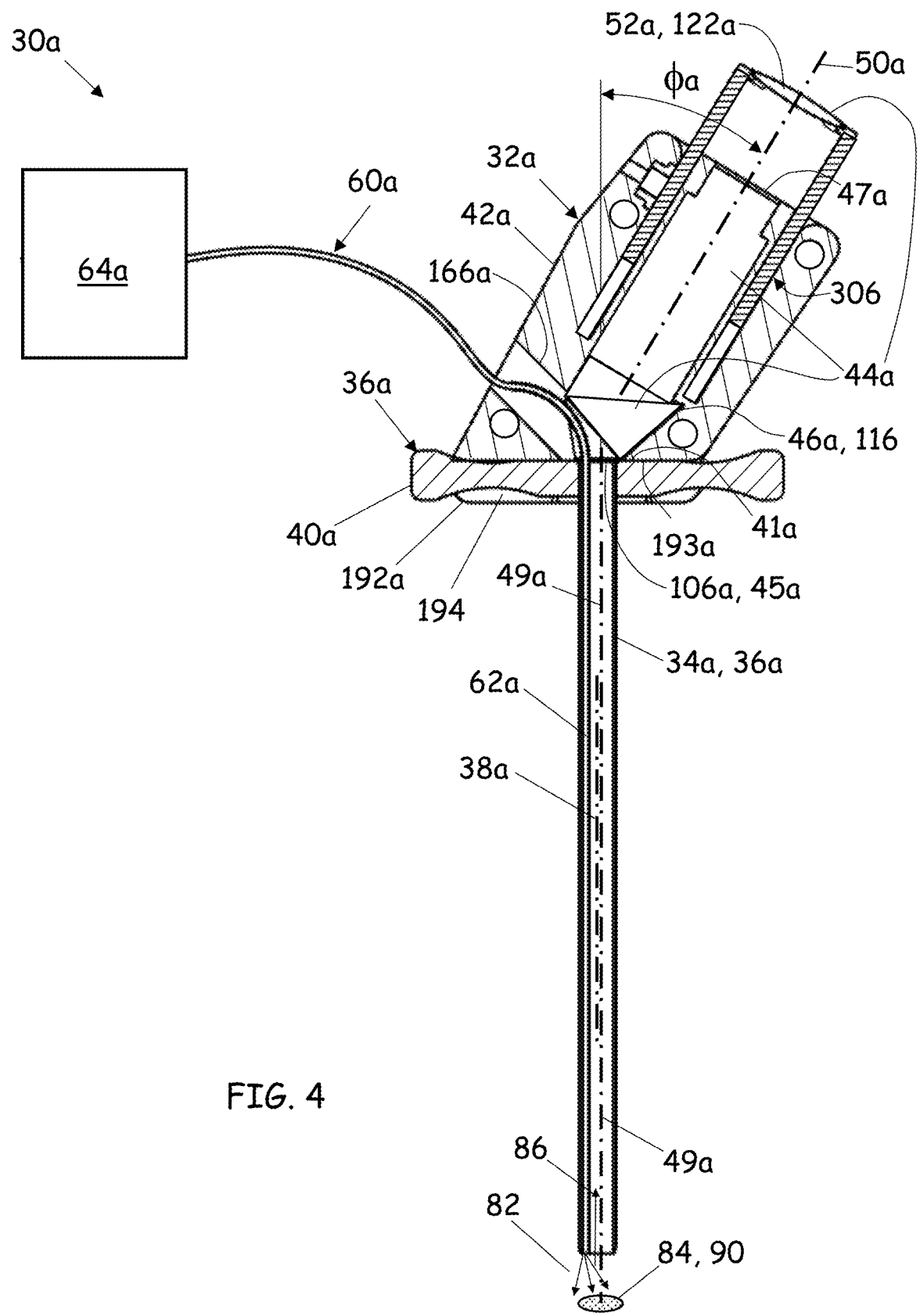
FIG. 4 is an elevational sectional view of the assembled surgical viewing system of FIG. 3 according to an embodiment of the disclosure.

Referring to FIGS. 2 through 4, a surgical viewing system 30a is depicted according to an embodiment of the disclosure. An optical adaptor 32a is selectively coupled to a handle 40a of an access portal 36a (FIGS. 2 and 3). In some embodiments, the handle 40a defines a proximal face 41a and includes a junction portion 104a at a junction of a tubular structure 34a that defines an opening 106a to the access portal 36a, with at least one grip portion 108a extending laterally from the junction portion 104a. The junction portion 104a may include opposed, outward-facing engagement flats 112a. The grip portions 108a may be ergonomic, defining a curved profile 114a.

For the surgical viewing system 30a, a transfer element 46a is a refractive prism 116 that refracts the reflected light component 86 that reaches the refractive prism 116 to define a transfer axis 50a at an acute transfer angle da relative to a viewing axis 49a. Focusing optics 52a may include a magnification lens 122a positioned on a telescopic mount 124 that can be translated along the transfer axis 50a.

Figure 5:
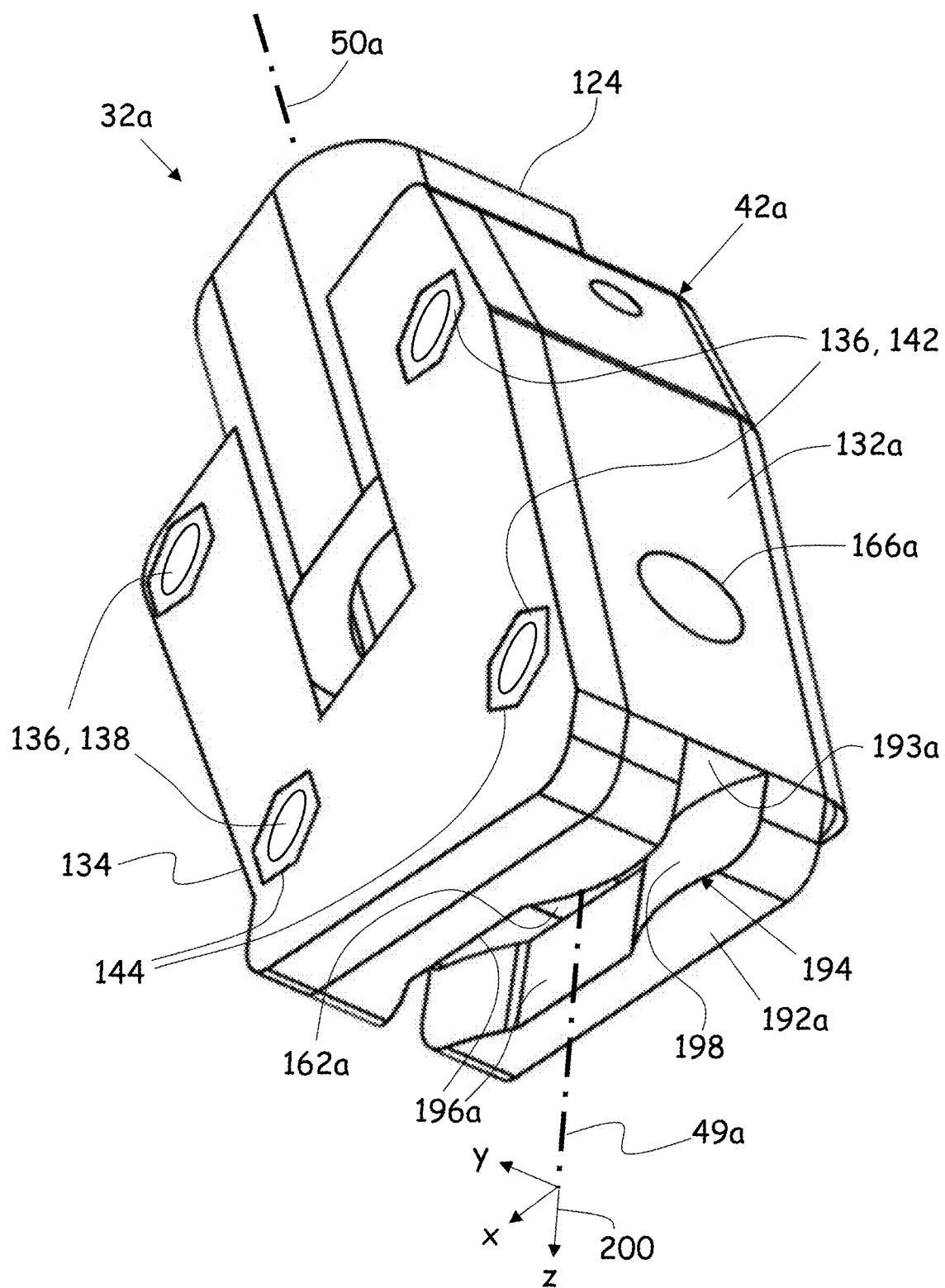
FIG. 5 is a distal perspective view of an optical adaptor for the surgical viewing system of FIG. 1 according to an embodiment of the disclosure.
Figure 6:
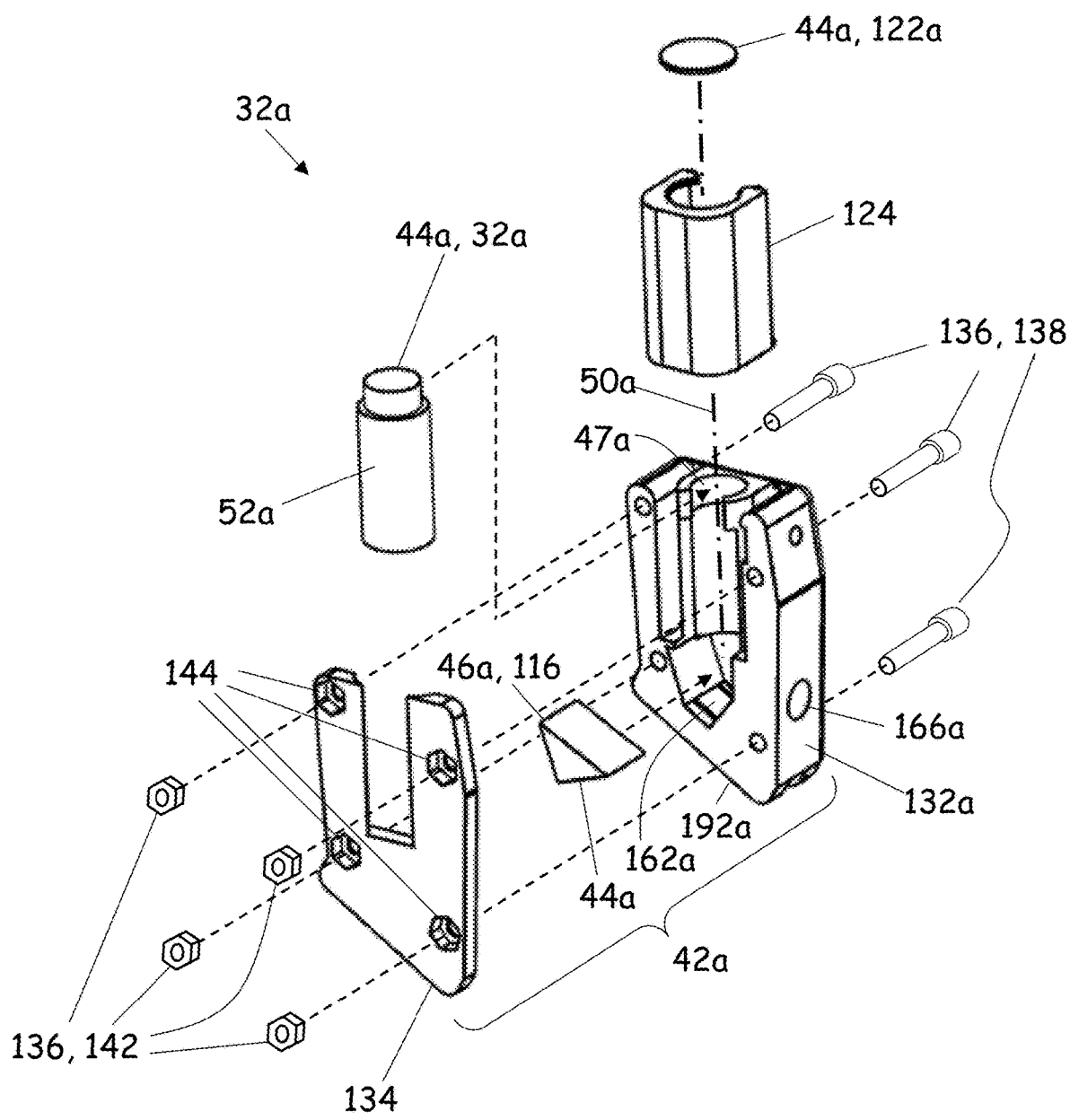
FIG. 6 is an exploded view of the optical adaptor of FIG. 5 according to an embodiment of the disclosure.

Referring to FIGS. 5 and 6, the optical adaptor 32a is depicted according to an embodiment of the disclosure. The optical adaptor 32a includes the viewing optics 44a (transfer element 46a and focusing optics 52a with magnification lens 122a). The housing 42a includes a body portion 132a and a closure 134 held together by fasteners 136, for example cap screws 138 and nuts 142. The body portion 132 and closure 134 may define mounting cavities 144 for the fasteners 136.

The housing 42a defines an optical inlet port 45a that subtends the viewing axis 49a and an outlet port 47a that subtends the transfer axis 50a. The housing 42a may also define a routing port 166a that extends distal to the transfer element 46a and intersects the optical inlet port 45a (FIG. 4). In the depicted embodiment, the housing 42a is configured to laterally receive the transfer element 46a and the focusing optics 52a.

In some embodiments, a base portion 192a of the housing 42a defines a mounting face 193a and a mounting slot 194 (FIG. 5) configured to receive the handle 40a and seat against the proximal face 41a of the access portal 36a. The mounting slot 194 may include opposed, inward-facing engagement flats 196a configured to slidingly engage the outward-facing engagement flats 112a of the handle 40a. The mounting slot 194 may also define profiled channels 198 that are complementary to the curved profile 114a of the handle 40a.

A Cartesian coordinate 200 is depicted in FIG. 5 and elsewhere throughout the disclosure. The Cartesian coordinate is of arbitrary origin, with the z-axis being parallel to the central and viewing axes 38 and 49.

Referring to FIGS. 7 through 9, the access portal 36a of the surgical viewing system 30a is depicted and described in more detail according to an embodiment of the disclosure. In some embodiments, a light probe 62a is integral with the access portal 36a. That is, the light probe 62a may be a permanent part of the access portal 36a. The light probe 62a includes a sheath 214a that extends axially along an inner surface 216a of the access portal 36a with a distal end 220a of the light probe 62a proximate a distal end 218a of the access portal 36a. The sheath 214, 214a may define an oblong cross-section 222 defining a major dimension 224 and a minor dimension 226, the major dimension 224 being greater than the minor dimension 226. For embodiments including the fiber optic shim 210, a source 64a may be a light source that delivers optical light to the fiber optic shim 210 via fiber a fiber optic cable.

In some embodiments, the light probe 62a includes a fiber optic element or elements 212 bounded by the sheath 214, 214a. The sheath 214, 214a may be a separate tube 228 (FIG. 8), for example, as with a fiber optic shim 230 that is inserted into the access portal 36a. In some embodiments, the sheath 214, 214a is attached to or otherwise in contact with the inner surface 216a, for example by bonding, soldering, or welding techniques. Incorporating the separate tube 228 as the sheath 214a of the light probe 62a enables retrofitting of an existing access portal 36. Alternatively, the sheath 214a may be a unitary structure 232 (FIG. 9) formed, for example, as an extruded lumen within the access portal 36a. The fiber optic element(s) 212 may be a fiber optic bundle 232 (depicted) or a single fiber optic element. In some embodiments, the sheath 214 is formed of a metallic material, such as stainless steel. Polymer materials are also contemplated for the sheath 214a. Sheathed fiber optic bundles are commercially available, for example from Myriad Fiber Imaging Tech., Inc., of Dudley, Massachusetts, U.S.A.

Functionally, the viewing optics 44a collect, image, and transfer the reflected light component 86. The refractive prism 116 defines a transfer angle φa in a transfer element 46a that is compact, the transfer angle φa presenting an ergonomic viewing angle for the viewer 88. The magnification lens 122a enlarges the image of the focusing optics 52a. The mounting cavities 144 enable the fasteners 136 to mount flush or below the surface of the housing 42, and may be shaped to hold the nuts 142 stationary during assembly. The routing port 166 enables passage of the source cable.

The inward- and outward-facing engagement of flats 196a, 112a provide registration surfaces that stabilize and reduce play and rotation between the optical adaptor 32a and the handle 40a. The oblong cross section 222 provides a lower profile relative to the viewing axis 49b for a larger field of view of the target 84.

Figure 12:
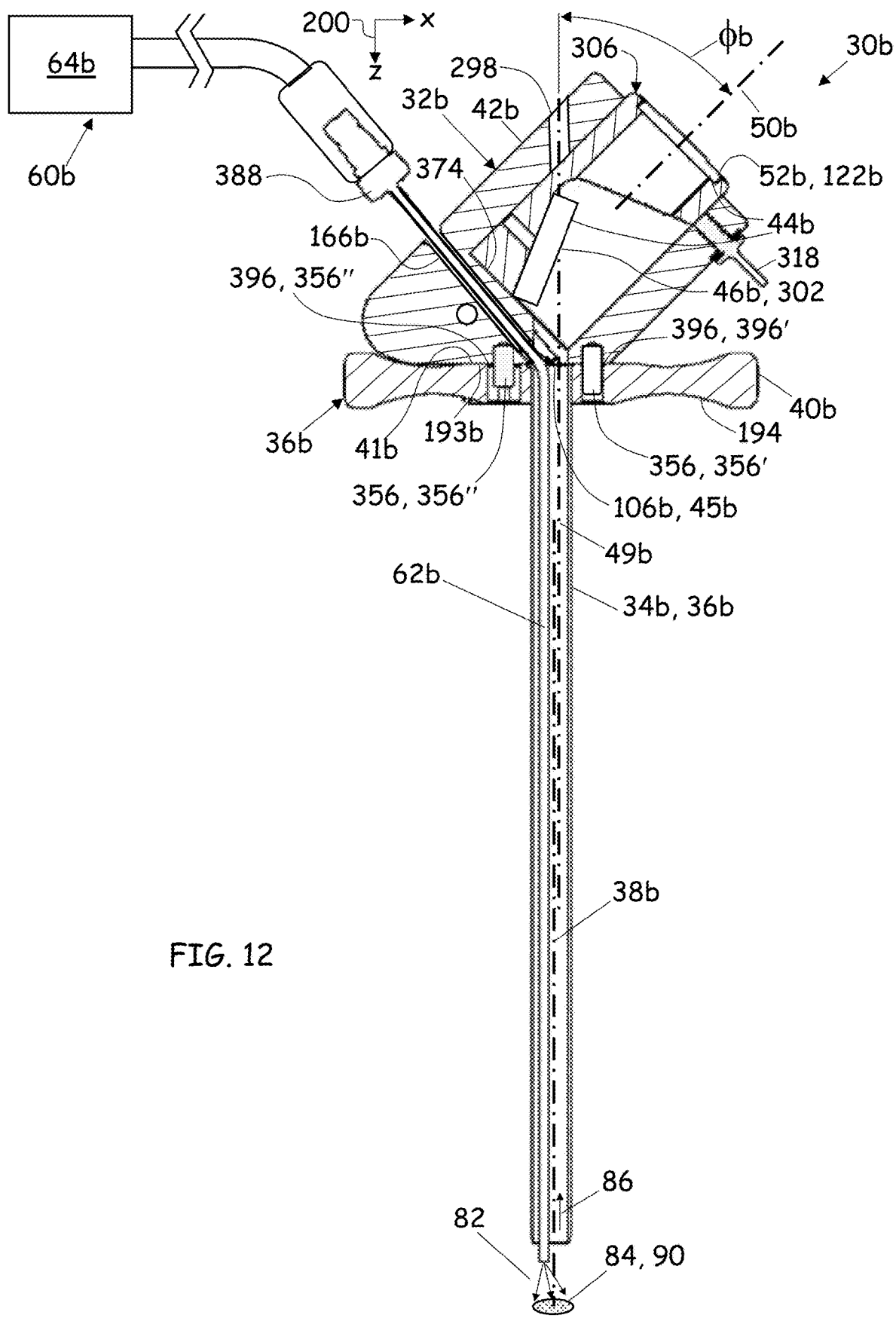
FIG. 12 is an elevational sectional view of the assembled surgical viewing system of FIG. 11 according to an embodiment of the disclosure.

Referring to FIGS. 10 through 12, a surgical viewing system 30b is depicted according to an embodiment of the disclosure. An optical adaptor 32b is selectively coupled to a handle 40b of an access portal 36b (FIGS. 10 and 11). A light probe 62b extends from the optical adaptor 32b and into the access portal 36b. The optical adaptor 32b is seated on the handle 40b so that a distal end 220b of the light probe 62b is proximate a distal end 218b of the access portal 36b. The light probe 62b may be selectively coupled to the source 64b for irradiation of the surgical site 90 with incident light 82. In some embodiments, the housing 42b defines an auxiliary port 298 that is in substantial alignment with the viewing axis 49b.

For the surgical viewing system 30b, a transfer element 46b is a mirror 302 that reflects the reflected light component 86 that reaches the mirror 302 to define a transfer axis 50b at an acute transfer angle φb relative to a viewing axis 49b. Focusing optics 52b may include a magnification lens 122b through which the transfer axis 50b passes.

Referring to FIGS. 13 through 16, the optical adaptor 32b is depicted according to an embodiment of the disclosure. The optical adaptor 32b includes the viewing optics 44b (transfer element 46b and focusing optics 52b with magnification lens 122b). The housing 42b includes a base portion 192b and a body portion 132b. The body portion 132b defines a socket 304 configured to receive an optical cartridge 306. The housing 42b may define a threaded through-hole 312 defining a through axis 314 that passes through a wall 316 of the body portion 132b, the threaded through-hole 312 being configured to receive a set screw 318, for example a thumb screw (depicted). In some embodiments, the housing 42b defines a side channel 332 configured to laterally receive the light probe 62b and a probe retainer 334. The housing 42b may also define a tapped hole 336 that extends laterally, defining a lateral axis 338 and configured to receive a side fastener 342 such as a thumb screw (depicted).

The base portion 192b defines an optical inlet port 45b at a mounting face 193b, the optical inlet port 45b subtending the viewing axis 49b. In some embodiments, the base portion 192b includes laterally opposed bosses 352 defining a gap 354 therebetween (FIG. 13), the gap 354 being dimensioned to receive a handle 40b of access portal 36b. The bosses 352 may include opposed, inward-facing engagement flats 196b. In some embodiments, one or more dowel pins 356 protrudes distally from the base portion 192b. Where two dowel pins 356', 356" are implemented, one may extend distally further than the other (FIG. 12).

In some embodiments, the optical cartridge 306 includes a frame 360 having a collar portion 362 at a proximal end 364 of the frame 360, the collar portion 362 defining an outlet port 47b configured to receive the magnification lens 122b. The optical cartridge 306 includes a mounting portion 366 for mounting of the transfer element 46b. The optical cartridge 306 may include a gusset portion 368 that rigidly secures the mounting portion 366. The optical cartridge 306 includes the viewing optics 44b, securing the transfer element 46b (i.e. mirror 302) in a fixed relationship with the magnification lens 122b. The transfer element 46b as mounted to the mounting portion 366 is defines the transfer axis 50b.

The socket 304 includes an interior wall 372 and a registration surface 374 (FIG. 12) at the base portion 192b.

In some embodiments, the socket 304 surrounds the optical cartridge 306 in assembly. In some embodiments, the socket 304 and frame 360 are configured to provide a close sliding fit.

The light probe 62b includes a sheath 214b that may define a circular cross-section (depicted) or an oblong cross-section (akin to sheath 214a of FIG. 8). In some embodiments, the sheath 214b includes a proximal portion 382 and a distal portion 384 separated by an elbow portion 386. The light probe 62b may include a connector 388 that terminates the proximal portion 382 of the sheath 214b for selective connection to a source 64b. For embodiments where the source 64b is a light source, the connector 388 may be a fiber optic connector. For embodiments where the source 64b is an electrical source, the connector 388 may be an electrical connector.

Figure 16:
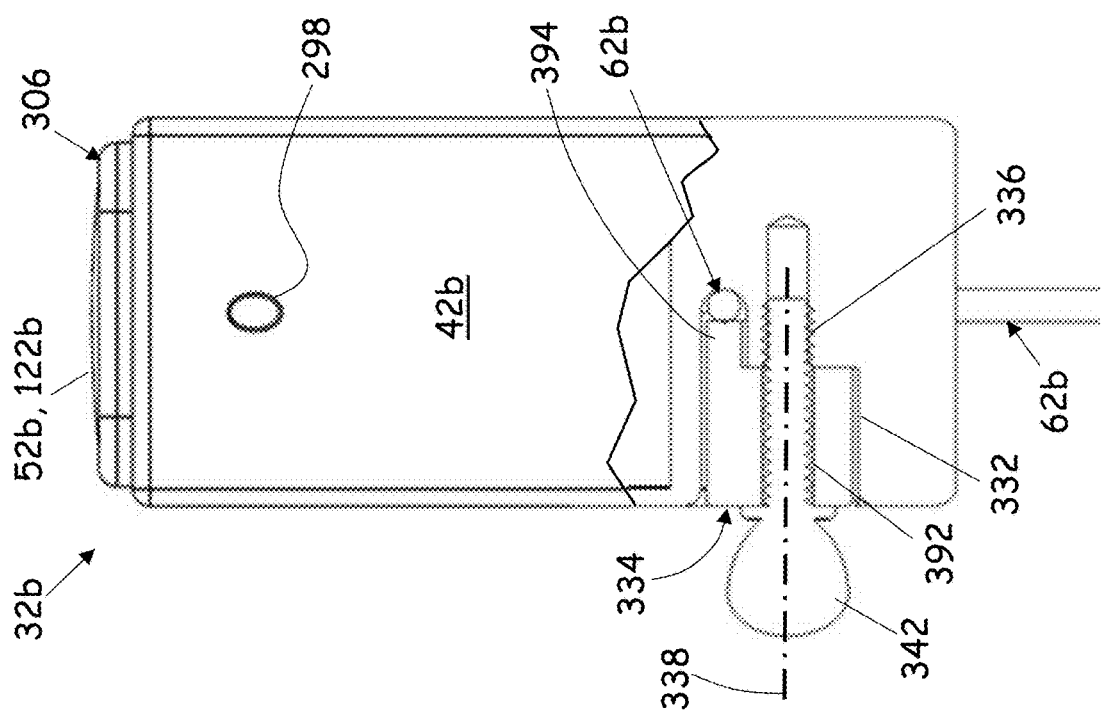
FIG. 16 is a cutaway sectional view of the optical adaptor of FIG. 13 according to an embodiment of the disclosure.

The probe retainer 334 is configured to seat within the side channel 332. The probe retainer 334 may define a clearance hole 392 that aligns with the lateral axis 338 when the probe retainer 334 is seated with the side channel 332. The probe retainer 334 is configured and dimensioned to register against the proximal portion 382 of the sheath 214b when the light probe 62b is disposed in the side channel 332 (FIG. 16). In some embodiments, the probe retainer includes a lip portion 394 that registers against the light probe 62b when seated in the side channel 332.

Figure 17:
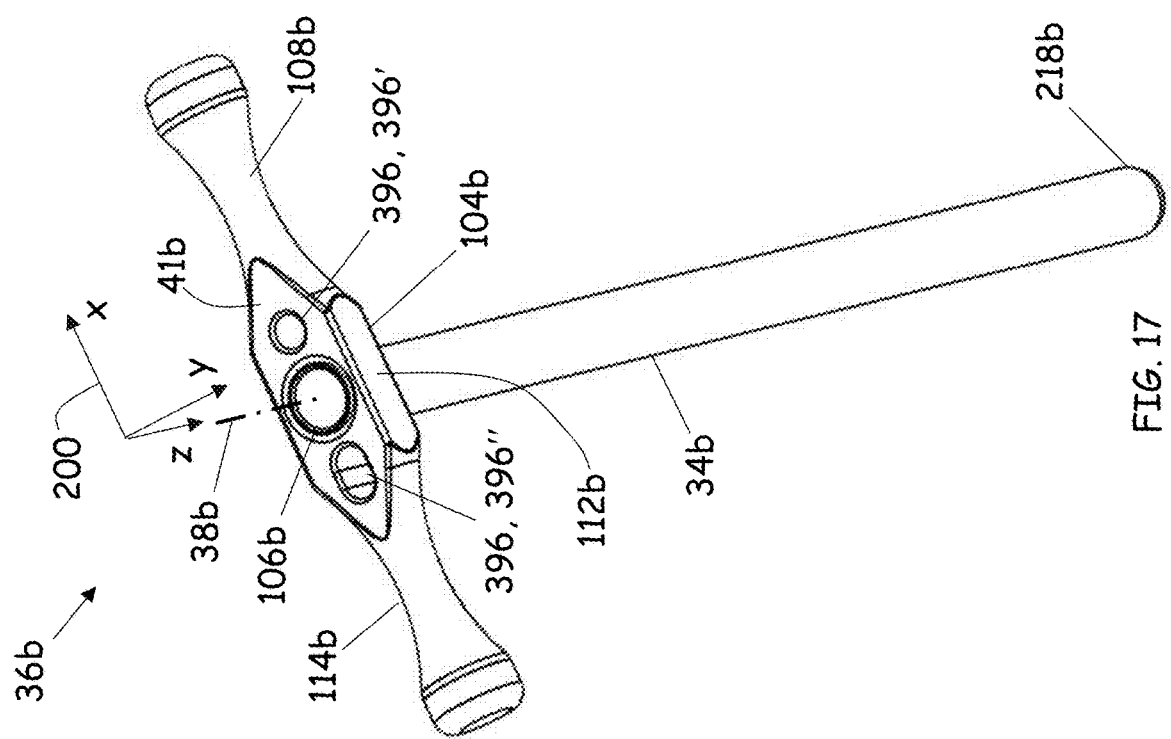
FIG. 17 is a proximal perspective view of an access portal of the surgical viewing system of FIG. 10 according to an embodiment of the disclosure.

Referring to FIG. 17, the access portal 36b of the surgical viewing system 30b is depicted and described in more detail according to an embodiment of the disclosure. The handle 40b includes a junction portion 104b at a junction of a tubular structure 34b that defines an opening 106b to the access portal 36b, with at least one grip portion 108b extending laterally from the junction portion 104b. The junction portion 104b may include opposed, outward-facing engagement flats 112b. The grip portions 108b may be ergonomic, defining a curved profile 114b. The outward-facing engagement flats 112b of the handle 40b may be configured to slidingly engage the inward-facing engagement flats 196b of the bosses 352.

In some embodiments, the handle 40b defines dowel apertures 396 accessible from a proximal face 41b of the handle 40b. The dowel apertures 396 may be dimensioned for a close sliding fit with the dowel pins 356', 356". In the depicted embodiment, one of the dowel apertures 396 defines a circular aperture 396' whereas the other defines a slotted aperture 396".

Figure 18:
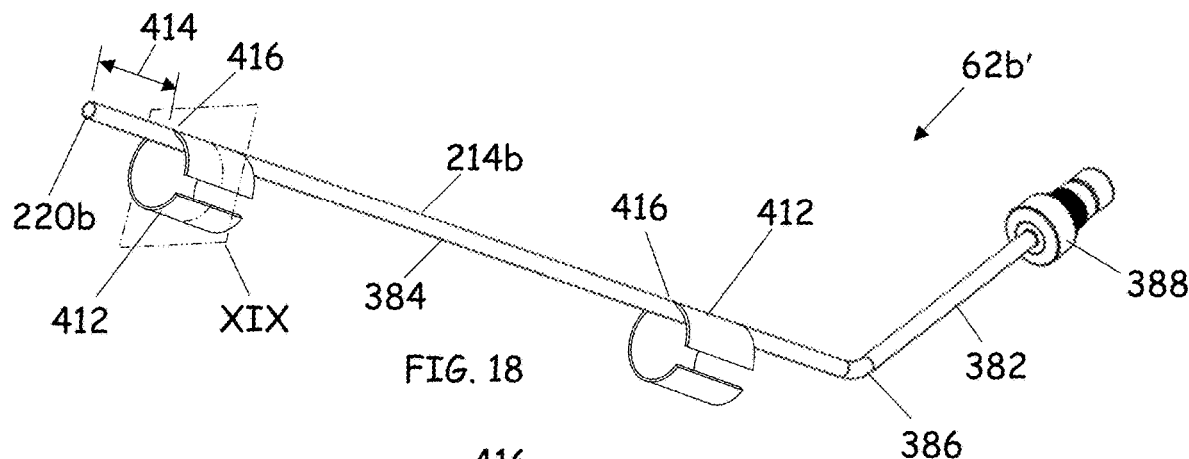
FIG. 18 is an isolation view of a light probe including radial biasing elements according to an embodiment of the disclosure.
Figure 19:
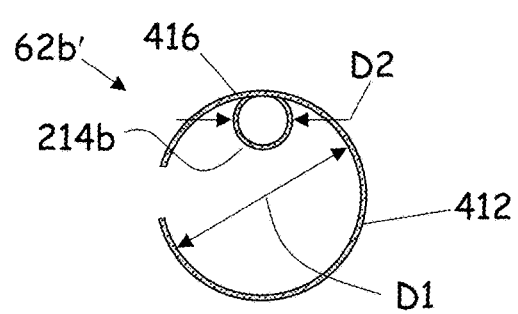
FIG. 19 is a sectional view of the light probe at plane XIX of FIG. 18 according to embodiments of the disclosure.

Referring to FIGS. 18 and 19, a light probe 62b' is depicted according to an embodiment of the disclosure. The light probe 62b' may include many of the same components and attributes as the light probe 62b, some of which are indicated in FIG. 18 with same-labeled reference characters. The light probe 62b' includes radial biasing elements 412 that are connected to the sheath 214b. The radial biasing elements 412 may be arcuate in shape, conforming generally to the shape of an inner surface of the tubular structure 34b. Accordingly, for the tubular structure 34b of circular cross-section (depicted in FIG. 17), the radial biasing elements are arcuate, tracing out an open circle (depicted), or, in some embodiments, tracing out a full circle (not depicted). In some embodiments, the radial biasing element 412 that is closest the distal end 220b of the light probe 62b' is set back from the distal end 220b by an axial offset 414. The sheath 214b may be machined or formed to define a tangential notch 416 within which the radial biasing elements 412 are affixed, so that an outer diameter D1 of the radial biasing elements 412 are substantially flush with an outer diameter D2 of the sheath 214b at the mounting locations (FIG. 19).

Functionally, the radial biasing elements register the light probe 62b' against one side of the inner surface of the tubular structure 34b, preventing or reducing obstruction of the reflected light component 86 that reaches the viewing optics 44b. The conformity of the radial biasing elements 412 to the inner surface of the tubular structure 34b also prevents obstruction of the reflected light component 86 that reaches the viewing optics 44b. The tangential notch 416 enables the light probe 62b' to be seated against the inner surface of the tubular structure 34b at the locations of the radial biasing elements 412, further limiting obstruction of the reflected light component 86. Also, the axial offset 414 relative to the distal end 220b of the light probe prevents obstruction of the image close to the target 84.

In assembly, the optical cartridge 306 is inserted into the socket 304 and may be seated against the registration surface 372. The set screw 318 is threaded into the threaded through-hole 312 and seated against the collar portion 362 of the frame 360 to secure the optical cartridge 306 in place. The light probe 62b and probe retainer 334 are laterally stacked into the side channel 332. The side fastener 342 is fed through the clearance hole 392 and coupled to the tapped hole 336 to securely clamp the light probe 62b in place.

The light probe 62b, now assembled with the optical adaptor 32b, is inserted into the tubular structure 34b of the access portal 36b, and the optical adaptor 32b seated on the proximal face 41b of the access portal 36b (FIGS. 10 and 11). During mounting of the optical adaptor 32b to the access portal 36b, the longer dowel pin 356' is first partially inserted into the circular aperture 396' and the shorter dowel pin 356" aligned with the slotted aperture 396". The optical adaptor 32b is translated onto the proximal face 41b of the access portal 36b, thereby fully inserting the dowel pins 356 into the apertures 396 and positioning the inward-facing engagement flats 196b of the bosses 352 adjacent the outward-facing engagement flats 112b of the handle 40b. The connector 388 (optional for some embodiments) may be connected to the source 64b of the illumination system 60b.

Functionally, the viewing optics 44b collect, image, and transfer the reflected light component 86. The transfer element 46b (mirror 302) defines a transfer angle øb that is ergonomic for the viewer 88. The magnification lens 122b enlarges the image of the focusing optics 52b. The connector 388 enables selective coupling to the outside source 64b.

The longer dowel pin 356', when seated within the circular aperture 396', prevents the optical adaptor 32b from translating laterally relative to the access portal 36b. The longer length of the dowel pin 356' relative to the shorter dowel pin 356" enables the dowel pin 356' to be aligned initially with only with the circular aperture 396' to start the mounting process. Once started, the optical adaptor 32b is properly oriented for easier insertion of the shorter dowel pin 356" into the slotted aperture 396". The shorter dowel pin 356", when seated within the slotted aperture 396", prevents rotation of the optical adapter 32b about the seated dowel pin 356'. Seating the optical adaptor 32b against the proximal face 41, 41b of the access portal 36b prevents distal translation of the optical housing relative to the access portal 36b.

In some scenarios, the auxiliary port 298 of the housing 42b enables access to the access portal 36b without need for removing the housing 42b from the viewing system 30b. The optical cartridge 306 may be removed from the housing 42b while leaving the rest of the viewing system 30b in place for direct access to the interior of the c of the access portal 36b. Such access during operation of the viewing system 30b can be beneficial, for example to clear the tubular structure 34b of obstructions that may obscure viewing of the target 84. An arrangement whereby the auxiliary port 298 extends through the optical cartridge 306 is also contemplated, thereby negating the need to remove the optical cartridge 306 for auxiliary access.

Alternatively or in addition, the inward- and outward-facing engagement of flats 196b, 112b provide registration surfaces that prevent rotation of the optical adaptor 32b about the dowel pin 356'. The bosses 352 can also stabilize and reduce play and rotation between the optical adaptor 32b and the handle 40b—not only about the dowel pin 356', but also roll about the x-axis (FIG. 17).

Figure 20:
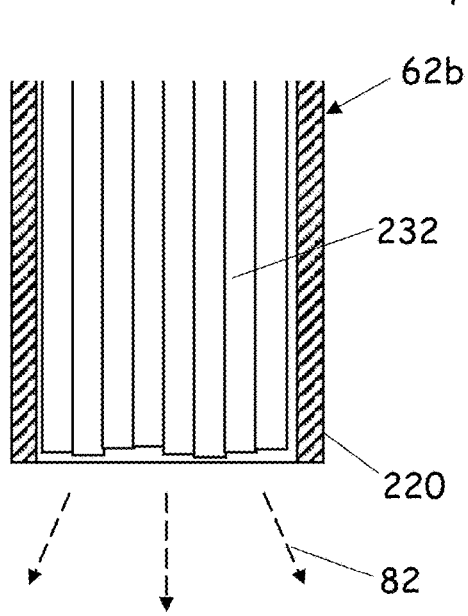
FIG. 20 is a sectional view of a distal end portion of a light probe that utilizes a fiber optic shim according to an embodiment of the disclosure.
Figure 21:
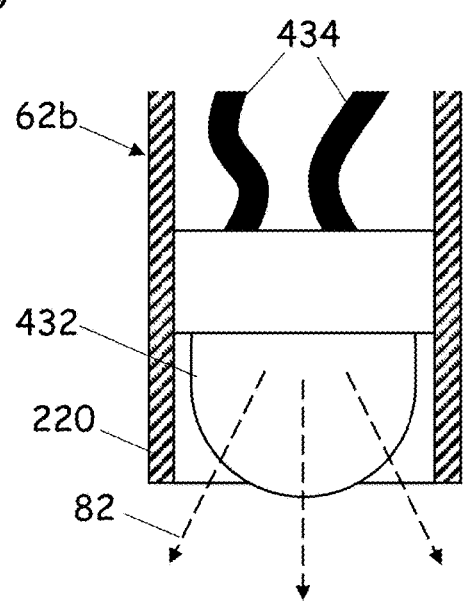
FIG. 21 is a sectional view of a distal end portion of a light probe that utilizes a light emitting diode according to an embodiment of the disclosure.

Referring to FIGS. 20 and 21, possible alternative light sources for delivery of optical light at the distal end 220 of the light probe 62 are depicted according to embodiments of the disclosure. The embodiment of FIG. 20 depicts the fiber optic bundle 232, which is adequately described attendant to FIG. 8. The embodiment of FIG. 21 depicts a local light source 432, for example an LED, disposed in the light probe 62 proximate the distal end 220 and arranged to cast visible light through the distal end opening, thereby providing the incident light 82 of the surgical viewing system 30. The local light source 432 is sourced by electrical wires 434 that may be routed through the sheath 214 of the light probe 62.

Referring to FIGS. 22 through 25, a surgical viewing system 30c is depicted according to an embodiment of the disclosure. The surgical viewing system 30c may include components and attributes of the surgical viewing systems 30a and 30b, some of which are indicated in FIGS. 22 through 25 with same-labeled reference characters. A distinguishing aspect of the surgical viewing system 30c is a spacer assembly 440 that separates an optical adaptor 32c from an access portal 36c. In some embodiments, the spacer assembly 440 includes an insert 442 that extends into a tubular structure 34c of the access portal 36c. A distal end 445 of the insert 442 may define an acute angle θ relative to a central axis 444 of the insert 442. The spacer assembly 440 may include an aspiration port 446 equipped with a fitting 448.

In some embodiments, the optical cartridge 306 defines an asymmetric cross-section 450 normal to a transfer axis 50c, the socket 304 defined by the housing 42c being configured to complement the asymmetric cross-section 450. For example, the asymmetric cross-section 450 may define a substantially square cross-section with a single corner 451 being clipped or chamfered (depicted).

The optical adaptor 32c includes a probe retainer 452 that may include components and attributes of the probe retainer 334 of housing 42b, some of which are indicated by same-numbered reference characters. The probe retainer 452 includes a detent 454 (FIG. 25) that seats within a groove 456 (FIG. 24) formed on the spacer assembly 440 for securing the optical adaptor 32c to the spacer assembly 440. A similar groove 458 may be formed on an outward-facing engagement flat 112c of a handle 40c of the access portal 36c for alternative mounting directly to the access portal 36c.

Referring to FIGS. 26 and 27, the spacer assembly 440 is described in further detail according to an embodiment of the disclosure. The spacer assembly 440 includes the spacer 460 to which the insert 442 is mounted. The spacer 460 includes a proximal end 462 and a distal end 464 at opposed ends of a body portion 466. The proximal and distal ends 462 and 464 define an axial distance 470 therebetween. In some embodiments, the axial distance 470 is in a range from 1 centimeter to 10 centimeters inclusive; in some embodiments, from 1.2 to 5 centimeters inclusive.

In some embodiments, the proximal end 462 defines dowel apertures 468 that are dimensioned to replicate the dowel apertures 396 of the handle 40c, (e.g., such as depicted at FIG. 17 for handle 40b). The distal end 464 may include protrusions 472 that extend distally from the body portion 466. The protrusions 472 may be dimensioned to replicate the arrangement of the dowel pins 356 of optical adaptor 32b, including protrusions 472' and 472" of different lengths (depicted). In some embodiments, the protrusions 472 are themselves dowels 474 pressed into receptacles 476 (depicted).

The body portion 466 defines a through-passage 478 that defines a central axis 480. The distal end 464 may define an O-ring gland 482 that surrounds the through-passage 478 for seating an O-ring 484. In some embodiments, the aspiration port 444 tangentially intersects the through-passage 478. The body portion 466 may define a contoured shape 486, such as a concave or "hour-glass" shape 488.

In some embodiments, the insert 442 defines a longitudinal recess 512 (described in further detail attendant to FIG. 28) that, in cooperation with the through-passage 478, defines a radial void 490 at the proximal end 462 of the spacer assembly 440. The insert 442 may be secured to the spacer 460 with a bonding 492, for example, a weld (depicted), brazing, adhesive, or other appropriate material and technique available to the artisan. The bonding 492 may be continuous along a tangential interface 494 where the insert 442 substantially conforms to the through-passage 478 (i.e., around the perimeter of the insert 442 except at the radial void 490). Alternatively, the insert 442 may be secured to the through-passage 478 by a bondless technique, such as an inference fit.

Suitable materials for the insert 442 include biocompatible materials such as stainless steel or biocompatible polymers. Inserts 442 formed of ductile metals may be formed in a crimping and rolling process. Polymers may be extruded or built up in a three-dimensional printing process.

In some embodiments, a seal plug 496 may be disposed between the insert 442 and the through-passage 478 at the proximal end 462 of the spacer assembly 440. The seal plug 496 may be configured to conform to the radial void 490 that is defined between the insert 442 and the through-passage 478 at the proximal end 462. In some embodiments, the seal plug 496 includes an orifice 498 configured to receive a sheath 214c of the light probe 62c. The seal plug 496 may, for example, be pre-formed to the shape of the void 490 but oversized to provide sealing contact between the insert 442 and the through-passage 478 and at the ends of the interface 494, akin to a grommet. In some embodiments, the seal plug 496 is an elastomeric potting which operates akin to a septum that is pre-pierced. Embodiments where the seal plug 496 and inserter 442 are integral components, for example formed from biocompatible polymer, is also contemplated.

Referring to FIG. 28, a cross-section 510 of an assembly of the insert 442, the tubular structure 34c, and a light probe 62c are depicted in according to an embodiment of the disclosure. The cross-section 510 is at plane XXVIII of FIG. 23, which is normal to the central axis 38c of the tubular structure 34c. The insert 442 defines a longitudinal recess 512. Herein, the "recess" of the longitudinal recess 512 is in relation to an inner radius IR of tubular structure 34c. As such, the longitudinal recess 512 does not necessarily define a concavity, but rather a reduced radial dimension relative to the inner radius IR that can accommodate passage of the light probe 62c. In some embodiments, the longitudinal recess 512 defines a flute 514 that extends the length of the insert 442.

The insert 442 defines a lateral mid-plane 516 about which the longitudinal recess 512 is centered, the lateral mid-plane 516 extending through an area centroid 518 of a cross-section 522 of the insert 442. An interior surface 526 of the insert 442 defines a minimum lateral span 524 having an interior lateral dimension L that extends from the longitudinal recess 512 to a diametrically opposed point 528 of the insert 442. The central axis 444 of the insert 442 is defined at the midpoint of the minimum lateral span 524 (i.e., at a distance L/2 from either the longitudinal recess 512 (depicted) or the diametrically opposed point 526).

The interior surface 526 of the insert 442 defines a viewing passage 542 that captures the reflected light component 86. The insert 442 cooperates with the inner radius IR of the tubular structure 34c to define a lighting passage 544. The lighting passage 544 is dimensioned to receive and allow insertion of the light probe 62c. The light probe 62c may include, as depicted, a second elbow portion 546 (FIG. 22) in addition to the elbow portion 386. In some embodiments, the insert 442 provides a continuous barrier between the viewing passage 542 and the lighting passage 544 along the length of the insert 442.

In assembly, the asymmetric cross-section 450 of the optical cartridge 306 oriented with and inserted into the complementary socket 304 and fixed in place with the set screw 318. The light probe 62c is laterally inserted into the side channel 332 with the elbow portions 386 and 546 straddling the fore- and aft-ends of the side channel 332. The distal portion 384 of the light probe 62c is inserted into the through-passage 478 of the spacer assembly 440. Such insertion is made through the 498 orifice of the seal plug 496 for assemblies 440 that are so-equipped.

With the light probe 62c inserted into the through-passage 478, the optical adaptor 32c is seated on the proximal end 462 of the spacer assembly 440 so that the dowel pins 356 are registered in the dowel apertures 468. The distal portion 384 of the sheath 214c is thereby positioned adjacent the longitudinal recess 512 of the insert 442. The probe retainer 452 is coupled to the optical adaptor 32c and spacer assembly 440 so that the lip portion 394 is registered against or adjacent to the light probe 62c within in the side channel 332 and the detent 454 is engaged within the groove 456 of the spacer 460. The side fastener 342 is fed through the clearance hole 392 of the probe retainer 452 and coupled to the tapped hole 336 (FIG. 15) to secure the light probe 62c as well as the spacer assembly 440 to the optical adaptor 32c.

The insert 442 of the spacer assembly 440 is inserted into the access portal 36c and the spacer 460 seated on the proximal face 41c of the handle 40 to register the protrusions 472 of the spacer 460 within the dowel apertures 396. Such assembly defines the lighting passage 544 between the insert 442 and the inner radius IR of the tubular structure 34c. Such coupling of the spacer assembly 440 and the access portal 36c may be performed before or after the coupling of the optical adaptor 32c to the spacer assembly 440. Other aspects of the assembly may include steps outlined for assembly of the surgical viewing system 30b described attendant to FIGS. 10 through 17 (e.g., seating of the optical cartridge 306 within the housing 42c, insertion of dowel pins 356' and 356" of differing lengths), which the artisan will understand and can implement mutatis mutandis in light of this disclosure.

Functionally, the insert 442 divides the cross-section 510 into the viewing and lighting passages 542 and 544. The longitudinal recess 512 contains the distal portion 384 of the light probe 62c, preventing encroachment of the sheath 214c into the field of view of the target 84. The acute angle θ defined at the distal end of the insert 442 provides a lead-in that facilitates insertion of the insert 442 into the access portal 36c. The spacer 460 also enables the overall length of the surgical viewing system 30c to be tailored to accommodate desired focal lengths of the for the viewing optics 44 without changing the length of the access portal 36c, which may adversely affect use of standard tools for cannulated surgical systems.

For embodiments where the insert 442 provides a continuous barrier between the viewing passage 542 and the lighting passage 544, the aspiration port 444 enables a suction to be applied to the lighting passage 544. The suction can be utilized to remove debris via the lighting passage 544 for better viewing of the surgical site 90 and less attenuation of the incident light 82 while leaving the viewing passage 542 clear. The bonding 492 and/or interface 494, the seal plug 496, and the O-ring 480 function to pneumatically isolate the lighting passage 544 from ambient, thereby enhancing the suction effect at the surgical site 90. The O-ring 480, when implemented, seats against a proximal face 41c of the handle 40c to seal or partially seal the through-passage 478 and the tubular structure 34c of the access portal 36c. Alternatively, instead of the O-ring 480 and gland 482, a gasket (not depicted) may be disposed interstitially between the distal end 464 of the spacer 460 and the proximal face 41c of the handle 40c.

In some embodiments, the pneumatic isolation from ambient provided by the sealing arrangement (bonding 492, interface 494, the seal plug 496, and/or the O-ring 480) need not be capable of sustaining a high vacuum. The function of the sealing arrangement is to deliver adequate suction to clear the surgical site 90 and distal end 220 of the light probe 62 of debris, and to avoid excessive draw down of the pressure within the housing 42c. As such, configurations other than that depicted in FIGS. 26 and 27 are contemplated. For example, an interference fit at the interface 494 without the bonding 492 may provide sufficient suction at the surgical site 90 for some applications. Also, instead of applying a suction, the aspiration port 444 may be used to apply a gas purge or an irrigation fluid to clear the surgical site 90 and distal end 220 of the light probe 62 of debris.

The second elbow portion 546 of the light probe 62c cooperates with the elbow 386 to capture and properly position the light probe 62c within the side channel 332, parallel to the x-z plane. The opposed elbow portions 386, 546 aligns the distal portion 384 of the sheath 214c with the lighting passage 544 when the dowel pins 356 are seated on the spacer assembly 440 or access portal 36c during assembly.

The replications of the arrangements of the dowel apertures 396 and the dowel pins 356 by the dowel apertures 468 and the protrusions 472, respectively, enable the optical adaptor 32c to be mounted interchangeably to either the spacer assembly 440 or the handle 40c. The contoured shape 486 may facilitate gripping of the surgical viewing system 30c. The asymmetric cross-section 450 acts as a key that enables the optical cartridge 306 to be mounted in only the correct orientation.

The detent 454 seated within the groove 456 or 458 cooperate with the dowel pins 356 seated within the dowel apertures 396 or 468 to maintain the optical adaptor 32c in a fixed relationship with respect to the spacer assembly 440 or access portal 36c. The dowel pins 356 and apertures 396, 496 prevent translation and rotation parallel to the x-y plane of the Cartesian coordinate 200, and the detent 454 and groove 456, 458 prevent translation along the z-axis and rotation in the x-z and y-z planes of the Cartesian coordinate 200.

Each of the additional figures and methods disclosed herein can be used separately, or in conjunction with other features and methods, to provide improved devices and methods for making and using the same. Therefore, combinations of features and methods disclosed herein may not be necessary to practice the disclosure in its broadest sense and are instead disclosed merely to particularly describe representative and preferred embodiments.

Various modifications to the embodiments may be apparent to one of skill in the art upon reading this disclosure. For example, persons of ordinary skill in the relevant arts will recognize that the various features described for the different embodiments can be suitably combined, un-combined, and re-combined with other features, alone, or in different combinations. Likewise, the various features described above should all be regarded as example embodiments, rather than limitations to the scope or spirit of the disclosure.

Persons of ordinary skill in the relevant arts will recognize that various embodiments can comprise fewer features than illustrated in any individual embodiment described above. The embodiments described herein are not meant to be an exhaustive presentation of the ways in which the various features may be combined. Accordingly, the embodiments are not mutually exclusive combinations of features; rather, the claims can comprise a combination of different individual features selected from different individual embodiments, as understood by persons of ordinary skill in the art.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

Unless indicated otherwise, references to "embodiment(s)", "disclosure", "present disclosure", "embodiment(s) of the disclosure", "disclosed embodiment(s)", and the like contained herein refer to the specification (text, including the claims, and figures) of this patent application that are not admitted prior art.

For purposes of interpreting the claims, it is expressly intended that the provisions of 35 U.S.C. 112 (f) are not to be invoked unless the specific terms "means for" or "step for" are recited in the respective claim.

What is claimed is:

1. A viewing system for viewing a surgical site, comprising:
    an optical adaptor including a housing that defines an optical inlet port and an optical outlet port, said optical inlet port being defined at a base portion of said housing and subtending a viewing axis of said viewing system, said optical outlet port subtending a transfer axis of said viewing system, said transfer axis intersecting said viewing axis at an acute transfer angle;
    a light probe coupled to said optical adaptor and extending distal to said base portion of said housing and parallel to said viewing axis of said optical adaptor, said light probe being configured to illuminate a surgical site that is distal to said light probe;
    an access portal configured for passage of surgical tools to said surgical site, said access portal defining a handle configured for selective engagement with said base portion of said housing;
    a spacer assembly including a spacer and an insert, said spacer being configured for connection between said housing and said access portal for coupling of said optical adaptor to said access portal, said insert being configured for insertion into said access portal,
    wherein said insert defines a viewing passage and is configured to cooperate with a tubular structure of said access portal to define a lighting passage, said lighting passage being
    configured to receive said light probe; and
    viewing optics configured to view a target at said surgical site through said access portal and transfer reflected light from said target to said optical outlet port.

2. The viewing system of claim 1, comprising an aspiration port that is in fluid communication with said lighting passage.

3. The viewing system of claim 2, comprising a seal for isolation of said lighting passage from ambient pressure.

4. The viewing system of claim 1, comprising a probe retainer that secures said light probe within a channel defined by said housing, said probe retainer and said spacer including a detent and groove arrangement that secures said optical adaptor to said spacer assembly.

5. The viewing system of claim 4, wherein said probe retainer includes said detent and said spacer of said spacer assembly defines said groove.

6. A viewing system for viewing a surgical site, comprising: an access portal configured for passage of surgical tools to a surgical target, said access portal defining a handle with opposed laterally outward-facing engagement flats, and a housing defining an optical inlet port that subtends a viewing axis of said viewing system and an optical outlet port that subtends a transfer axis of said viewing system, said optical inlet port being defined at a base portion of said housing, said base portion defining a mounting slot configured to receive said handle, said mounting slot defining opposed inward-facing engagement flats configured to slidingly engage said opposed outward-facing engagement flats of said handle; a transfer element that directs light from said optical inlet port toward said optical outlet port; and focusing optics that focuses light received from said transfer element along said transfer axis,
    wherein said base portion of said housing is configured for selective engagement with said handle portion of said access portal.

7. The viewing system of claim 6, wherein said transfer axis is rotationally offset from said viewing axis at an acute transfer angle.

8. The viewing system of claim 6, wherein said focusing optics includes a magnification lens that magnifies an image of said focusing optics.

9. The viewing system of claim 6, wherein said access portal defines a central axis, said viewing axis of said optical adaptor being laterally offset from said central axis.

10. The viewing system of claim 6, said access portal including a tubular structure that depends from said handle, said handle including a junction portion, said junction portion defining said opposed laterally outward-facing engagement flats.

11. The viewing system of claim 10, wherein said handle includes at least one grip portion that extends laterally from said junction portion.

12. The viewing system of claim 11, wherein said mounting slot defines a profile that complements said at least one grip portion.

13. The viewing system of claim 6, wherein said viewing system is a handheld microscope.

\* \* \* \* \*